United States Patent [19]

Drake et al.

[11] Patent Number: 4,561,896

[45] Date of Patent: Dec. 31, 1985

[54] CORROSION INHIBITING COATINGS

[75] Inventors: Cyril F. Drake, Harlow; Gladys M. Jones, Epping; Ronald Jones, Sawbridgeworth, all of England

[73] Assignee: ITT Industries, Inc., New York, N.Y.

[21] Appl. No.: 466,958

[22] Filed: Feb. 16, 1983

[30] Foreign Application Priority Data

Mar. 30, 1982 [GB] United Kingdom ................ 8209284

[51] Int. Cl.⁴ .......................... C08K 3/40; C09D 5/10
[52] U.S. Cl. ................ 106/14.12; 106/14.05; 106/14.21; 106/14.44; 252/387; 428/325; 428/433; 523/444; 523/466
[58] Field of Search ..................... 252/387; 106/14.05, 106/14.12, 14.21, 14.44; 428/325, 433, 469; 523/444, 466

[56] References Cited

U.S. PATENT DOCUMENTS

| | | | |
|---|---|---|---|
| 4,110,128 | 8/1978 | Dreulle et al. | 106/14.12 |
| 4,126,469 | 11/1978 | Longuepee et al. | 106/14.12 |
| 4,168,983 | 9/1979 | Vittands et al. | 106/14.12 |
| 4,210,575 | 7/1980 | Drake | 106/14.44 |

FOREIGN PATENT DOCUMENTS 2656779  6/1978  Fed. Rep. of Germany .
1501745  2/1978  United Kingdom .

OTHER PUBLICATIONS

Encyclopedia of Minerals–p. 545, W. L. Roberts, G. R. Rapp, Jr. & J. Weber, editors, Van Nostrand Reinhold Co.

C. W. Kapse et al., "Influence of Phosphate Pretreatment on Durability of Zinc-Rich Paints"-Anticorrosion, Oct. 1982, 10–13.

*Primary Examiner*—Veronica P. Hoke
*Attorney, Agent, or Firm*—James B. Raden; Harold J. Holt

[57] ABSTRACT

A paint composition for inhibiting corrosion of a metal surface includes a powdered sacrificial metal for that surface and a powdered water soluble corrosion inhibiting glass. Typically the paint is a zinc rich paint and the glass is a calcium/zinc phosphate glass.

8 Claims, No Drawings

CORROSION INHIBITING COATINGS

This invention relates to compositions for inhibiting corrosion of a metal surface and to paint formulations containing such compositions. The invention also relates to metal articles or structures provided with such corrosion protection.

One of the major problems in the use of metals as structural materials and in fabricated articles is that of corrosion of the metal. Ferrous metals are particularly susceptible. Other metals may be used as alternatives to steel, such as aluminium or employed as protective layers to protect steel. Examples of materials which may be used in this way include zinc, aluminium, and cadmium.

Zinc coatings can be employed, for example, to protect steel from rusting. They have good corrosion resistance and because zinc is anodic to steel can provide sacrificial protection. These coatings can also be used to prevent corrosion when two dissimilar metals, e.g. copper and steel, are in contact.

In particular paints containing a powdered sacrificial metal have been employed as coatings on steel surfaces. Zinc is often used in the form of dust in paints. These paints may be used to protect, for example, steel, galvanised steel, or steel coated by the process described in UK Pat. No. 1424465 (Diamond Shamrock). Types of paints which are in common use include zinc dust/zinc oxide pigmented paints and zinc rich paints. Zinc rich paints may contain organic or inorganic binders, e.g. epoxy/polyamide, ethyl silicate etc. and are pigmented with high levels of zinc dust.

It is thought that zinc rich paints may protect steel in a similar manner to a continuous layer of metallic zinc in providing galvanic protection, as well as providing barrier protection to the base metal, but have the advantage that they may be applied by a variety of techniques including such conventional methods as spraying, dipping or brushing and can be applied at the factory or at the point of use. However if left unprotected from the environment they will rapidly corrode to form a layer of corrosion products on the surface which are unsightly and make further coating difficult. Frequently, even when they are overcoated prior to exposure to the environment, subsequent exposure and zinc corrosion leads to loss of intercoat adhesion and the build up of unsightly corrosion products on the top coat surface. In particular these effects have limited their use in applications requiring desirable finishes having a high standard of appearance.

The object of the present invention is to minimise or to overcome this disadvantage.

Our co-pending U.S. application Ser. No. 466,965, filed Feb. 16, 1983 now abandoned describes and claims a method of inhibiting corrosion of a non ferrous metal or alloy, said method including treating the metal surface with a corrosion inhibiting composition incorporating an acidic water soluble glass.

According to the present invention there is provided a paint formulation for inhibiting corrosion of a metal surface, said paint formulation including a particulate sacrificial metal for said metal surface, and a particulate water soluble glass having corrosion inhibiting properties.

The techniques described herein are particularly applicable to zinc rich paints, but it will be clear that the invention is not so limited and that the techniques can also be applied to paints containing other sacrificial metals.

We have found that incorporation of a corrosion inhibiting glass in said paints, such as those described in our copending U.S. Pat. Appln's. Ser. No. 06,516,664, filed July 25, 1983 now U.S. Pat. No. 4,518,429 and Ser. No. 06/466,965, filed Feb. 16, 1983 now abandoned, provides a high degree of corrosion protection for the zinc dust in a zinc rich paint and reduces the formation of surface deposits and loss of intercoat adhesion, without already influencing the protection afforded by the coating itself. Paint formulations of this type may thus be employed, even following prolonged exposure to an adverse environment in paint systems where a high standard of appearance is required. In particular the finish obtained is of sufficient quality for vehicle body applications.

Typically up to 50 weight percent of the zinc content of a conventional metallic zinc containing paint may be replaced by a corrosion inhibiting water soluble glass composition. The glass may for example be, but is not limited to, a calcium zinc phosphate glass. The glass is in powder form and may typically have a particle size of from up to 100 microns, although the upper limit will be lower in application where paint film thicknesses are less than 100 microns, e.g. for vehicle body uses.

For many applications suitable glasses comprise, but are not limited to, 30 to 60 mole % zinc oxide, a trace to 2 mole % alumina, a trace to 35 mole % calcium oxide and 35 to 45 mole % phosphorous pentoxide. In some applications these glasses may also incorporate vanadium pentoxide. Glasses of this type are described in our copending application Ser. No. 8138285 (C.F. Drake 84). It will of course be appreciated by those skilled in the art that the discrete oxides are not necessarily present in the glass in their free form. It is however both conventional and convenient to describe the composition of a glass in terms of the constituent oxides.

The glass is thoroughly dispersed in the paint formulation which may then be applied by any of the conventional techniques to a metal, e.g. steel, surface. We have found that such paints, unlike conventional zinc rich paints, show an excellent bond under aggressive conditions to a subsequent top or finishing paint coat which may be applied using materials and processes well known to those skilled in the art.

To illustrate the techniques described herein we have determined the corrosion rate of various non-ferrous metal specimens using the method described by M. Stern ("Corrosion", Vol. 14 pp 440–444, 1958).

Cylindrical samples of zinc, aluminium and copper of 0.8 cm diameter, and of cadmium of 0.6 cm diameter, were employed. The metals were of 99.999% purity or greater. Cylindrical sections of 1 cm length were drilled, tapped and wired on one circular face so as to permit subsequent electrical connection. The samples were then metallographically mounted in cold-cure polyester resin so that the opposite circular face of the sample was exposed. The exposed sample face were abraded with 220 grit abrasive paper immediately before placing 4 cm below the surface of test solutions.

Test solutions were prepared from aqueous 0.1M potassium chloride with pigment additive, where present, added at a concentration of 10 g $L^{-1}$. Glass pigments had average particle sizes of less than 10 microns. Test solutions were placed in a 25° C. thermostat bath.

Linear polarisation data was obtained using an H. B. Thompson and Associates "Ministat" potentiostat. The reference and auxiliary electrodes were calomel and platinum respectively. The "polarisation resistance", Rp, was determined 4 hours after the test electrodes had been placed in the test solutions. This was done by measuring the current resulting from the application of a potential of no more than ±25 mV with respect to the corrosion potential, Ecorr, of the test electrode. The potential was scanned at a rate of 5 mV min$^{-1}$ from the cathodic to the anodic region.

The inhibitive effect of a pigment is approximately inversely proportional to Rp, and the efficiency of inhibition I, expressed as a percentage is thus given by:

$$I(\%) = \frac{(1/Ro - 1/Ri)}{1/Ro} \cdot 100$$

$$= \frac{(Ri - Ro)}{Ri} \cdot 100$$

where Ro is the polarisation resistance in the absence of inhibitor and Ri is the polarisation resistance with inhibitor present.

Three glasses were used in these evaluations. They had the following Molar % compositions:

|         | ZnO  | Al$_2$O$_3$ | CaO  | P$_2$O$_5$ |
|---------|------|-------------|------|------------|
| Glass 1 | 56.2 | 1.3         | —    | 42.5       |
| Glass 2 | 50.9 | —           | 12.8 | 36.3       |
| Glass 3 | 31.6 | —           | 30.6 | 37.8       |

The results are summarised in the Table 1 below, with Examples 1 and 5 representing freely corroding controls, i.e. no added inhibitive pigment.

| Example | Electrode Metal | Corrosion Inhibitor | % Inhibition |
|---------|-----------------|---------------------|--------------|
| 1       | Zn              | None                | 0            |
| 2       | Zn              | Glass 1             | 89           |
| 3       | Zn              | Glass 2             | 99           |
| 4       | Zn              | Glass 3             | 99           |
| 5       | Al              | None                | 0            |
| 6       | Al              | Glass 1             | 67           |
| 7       | Al              | Glass 3             | 100          |

To illustrate further the technique two paint compositions were prepared. These were applied each to a steel panel at a film thickness of 75 microns, allowed to dry, then scribed through to ferrous metal and exposed to salt spray in accordance with ASTM B117-73. They were examined after 24 hours. The composition A, which was an untreated zinc rich paint and is included here for comparison purposes, showed very bad deterioration with blistering and formation of white deposits all over the film. The composition B was substantially free of corrosion products except for slight whitening within the scribe itself. The results are summarised in the Table below.

| FORMULATION FOR ZINC RICH PRIMERS BASED ON EPOXY ESTER | | |
|---|---|---|
| | % by weight | |
| Composition | (A) | (B) |
| Zinc dust (Durham Ultrafine) | 76.10 | 71.30 |
| Glass 3* | — | 3.46 |
| SYNOLAC 463X | 11.00 | 11.45 |
| Calcium Oxide | 0.50 | 0.52 |
| Bentone 38 | 0.70 | 0.73 |
| Nuodex Co 8% | 0.04 | 0.04 |
| Xylene | 11.66 | 12.50 |

*31.6 mole % ZnO, 30.6 mole % CaO and 37.8 mole % P$_2$O$_5$.

These examples illustrate the feasibility of the techniques described herein.

What is claimed is:

1. A paint formulation for inhibiting corrosion of a metal surface, said paint formulation including a particulate sacrificial metal for said metal surface, said sacrificial metal being selected from the group consisting of zinc, aluminum and cadmium, and a particulate water soluble glass having corrosion inhibiting properties.

2. The formulation of claim 1 in which the particulate sacrificial metal is zinc and the paint is a zinc rich paint formulation.

3. A paint formulation as claimed in claim 9, wherein the weight proportion of the glass in the formulation is less than or equal to 50 percent of the weight proportion of the zinc.

4. A paint formulation as claimed in claim 3, wherein the glass is a calcium zinc phosphate glass.

5. A paint formulation as claimed in claim 4, wherein the glass includes 30 to 60 mole % zinc oxide, 45 to 35 mole % phosphorus pentoxide, the remainder comprising up to 35 mole % calcium oxide and up to 2 mole % alumina.

6. A paint formulation as claimed in claim 5, wherein the glass has a particle size of 10 to 100 microns.

7. A metal structure provided with a coating of a paint formulation as claimed in claim 1.

8. A metal structure as claimed in claim 7 and comprising a vehicle body.

* * * * *